June 4, 1929.  A. STRAND  1,715,958
FLY TRAP
Filed Sept. 12, 1928  2 Sheets-Sheet 1
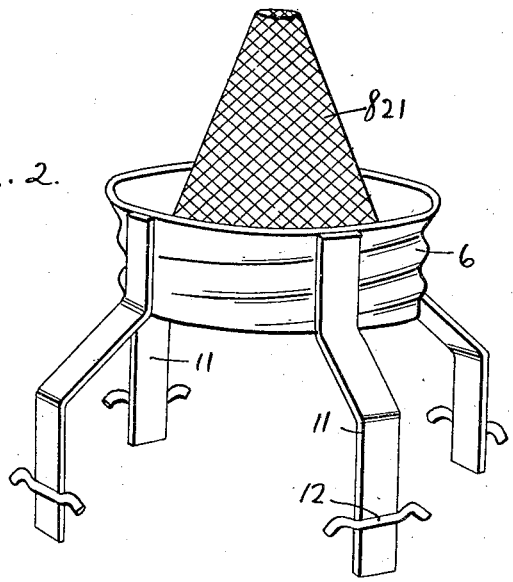
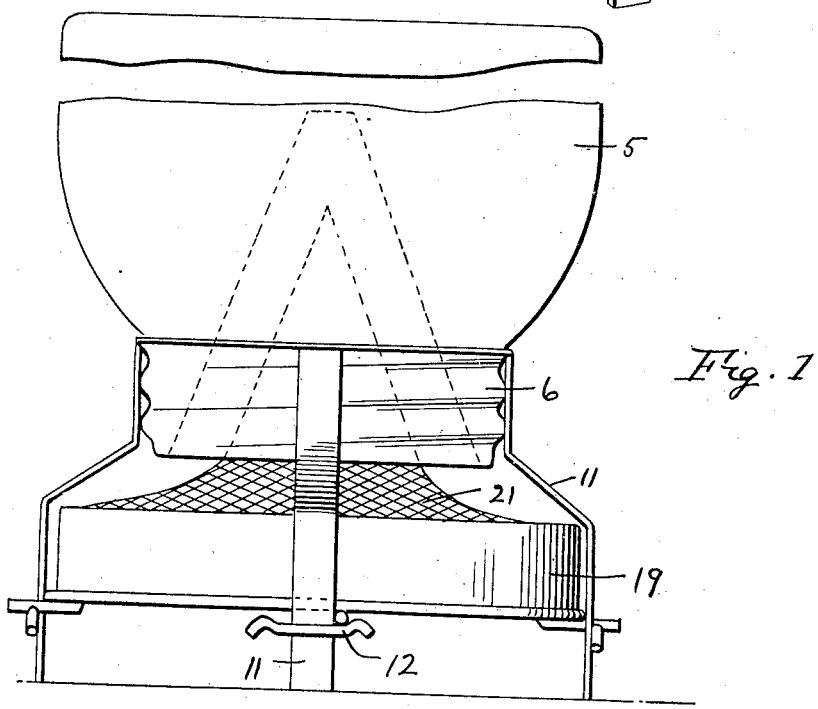
Inventor
Alfred Strand
By Clarence A. O'Brien
Attorney June 4, 1929.　　　A. STRAND　　　1,715,958
FLY TRAP
Filed Sept. 12, 1928　　　2 Sheets-Sheet 2
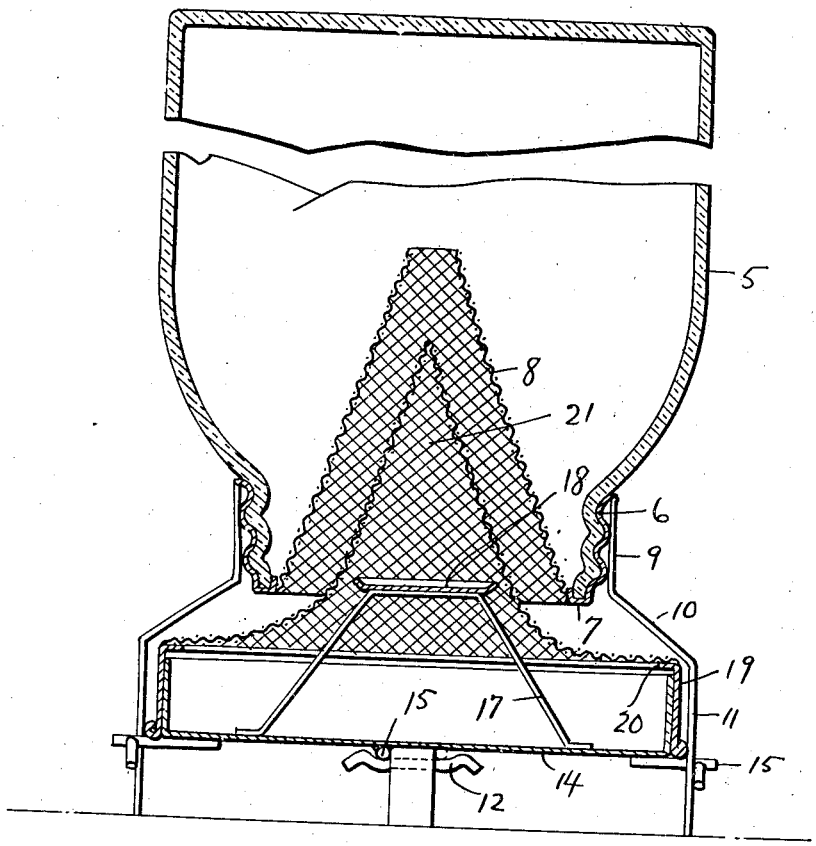
Fig. 3
Fig. 4
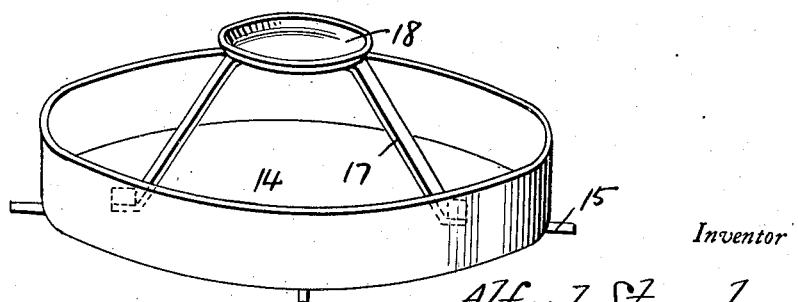
Inventor
Alfred Strand
By Clarence A O'Brien
Attorney Patented June 4, 1929.

1,715,958

UNITED STATES PATENT OFFICE.

ALFRED STRAND, OF VERNON, TEXAS.

FLYTRAP.

Application filed September 12, 1928. Serial No. 305,522.

The present invention relates to a fly trap and has for its prime object to provide a structure whereby the flies may be trapped in a glass jar in which they may be easily drowned.

A still further very important object of the invention resides in the provision of a fly trap of this nature which is exceedingly simple in its construction, inexpensive to manufacture, easy to assemble and disassemble, and thoroughly efficient and reliable in use.

With the above and numerous other objects in view as will appear as the description proceeds, the invention resides in certain novel features of construction, and in the combination and arrangement of parts as will be hereinafter described and claimed.

In the drawing:

Figure 1 is a side elevation of the trap embodying the features of my invention, Figure 2 is a perspective view of the stand of the trap, Figure 3 is a vertical section through the trap, and Figure 4 is a perspective view of the bait holder.

Referring to the drawing in detail it will be seen that the numeral 5 denotes an ordinary inverted Mason jar. A rim 6 is threaded on the neck of the jar and at its bottom end is provided with an inturned flange 7 which is secured to the lower edge of a frusto-conical mesh wire member 8 extending up into the jar.

A plurality of the legs are fixed to the rim 6. Each leg includes a portion 9 secured to the outside of the rim vertically and merging into an outwardly and downwardly inclined intermediate portion 10 which in turn merges into a perpendicular bottom portion 11 extending downwardly therefrom.

Arms 12 are mounted on intermediate portions of the lower parts 11 of the legs. A pan 14 is provided with a plurality of outwardly radiating lugs 15 to rest on the cross arms 12. The bracket 17 rises from the bottom of the pan 14 and supports a bait receptacle 18.

A cover includes a rim 19 telescoped over the pan 14 and at its upper edge merging into an inturned flange 20 to which the lower edge of a substantially conical shaped mesh wire member 21 is secured. This mesh wire member 21 covers the bait receptacle 18 and extends up into the frusto-conical member 8 so as to leave a passage therebetween for the flies to pass up into the jar 5 and be trapped therein.

Obviously the jar may be turned over and filled with water to drown the flies trapped therein. It will also be seen that the parts may be disassembled for cleaning purposes and may be easily assembled.

It is thought that the construction, utility and advantages of the invention will now be quite apparent to those skilled in this art without a more detailed description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A trap of the class described including an inverted jar having an inverted neck, a rim threaded on the neck having at its bottom end an inturned flange, a frustro-conical mesh wire member having its lower end fixed to the flange and extending upwardly into the jar, legs secured to the rim and depending downwardly therefrom, and means for supporting bait on the legs, said means comprising a receptacle, means for mounting the receptacle of the lower portions of the legs, a cover on the receptacle including a rim telescoped over the receptacle having a an inturned flange to which is secured the lower cone shaped mesh wire member extending up into the frusto-conical member, and a bracket rising from the pan affording a bait receptacle.

In testimony whereof I affix my signature.

ALFRED STRAND.